(12) United States Patent  
Hiltbold

(10) Patent No.: US 8,575,881 B2
(45) Date of Patent: Nov. 5, 2013

(54) CURRENT INJECTION CIRCUIT FOR DELAYING THE FULL OPERATION OF A POWER FACTOR CONTROL CIRCUIT FOR AC INDUCTION MOTORS

(75) Inventor: Gordon E. Hiltbold, Woodland Park, NJ (US)

(73) Assignee: Energy Innovative Products, Inc., Fairfield, NJ (US)

( * ) Notice: Subject to any disclaimer, the term of this patent is extended or adjusted under 35 U.S.C. 154(b) by 574 days.

(21) Appl. No.: 12/557,057

(22) Filed: Sep. 10, 2009

(65) Prior Publication Data

US 2011/0057601 A1 Mar. 10, 2011

(51) Int. Cl.
*H02P 1/42* (2006.01)
*G05F 1/70* (2006.01)

(52) U.S. Cl.
USPC ............................ 318/729; 318/438; 318/779

(58) Field of Classification Search
USPC .......... 318/430, 431, 727, 729, 778, 779, 438
See application file for complete search history.

(56) References Cited

U.S. PATENT DOCUMENTS

| | | | |
|---|---|---|---|
| 4,052,648 A * | 10/1977 | Nola | 318/810 |
| 4,266,177 A | 5/1981 | Nola | |
| 4,404,511 A * | 9/1983 | Nola | 318/729 |
| 4,417,190 A * | 11/1983 | Nola | 318/729 |
| 4,426,614 A * | 1/1984 | Nola | 323/243 |
| 4,439,718 A * | 3/1984 | Nola | 318/729 |
| 5,304,911 A | 4/1994 | Anderson | |
| 5,389,869 A | 2/1995 | Anderson | |
| 6,249,095 B1 | 6/2001 | Takura | |

* cited by examiner

*Primary Examiner* — Bentsu Ro
(74) *Attorney, Agent, or Firm* — Dentons US LLP

(57) ABSTRACT

An energy saver delay circuit for an induction motor is disclosed. The energy saver delay circuit includes a power factor control circuit including an integrator, the integrator having a negative summing junction and a current injection circuit electrically connected to the negative summing junction, the current injection circuit configured for injecting an offset current into the negative summing junction to cause about the maximum available voltage from a power source to be supplied to the motor for a predetermined amount of time. Current injection may be triggered by voltage being applied to the motor, wherein the voltage exceeds a predetermined value. Alternatively, current injection may be triggered by current flowing through the motor, responsive to the current exceeding a predetermined threshold current. Alternatively, current injection may be triggered by voltage across the power factor control circuit, responsive to the voltage exceeding a predetermined threshold voltage.

12 Claims, 7 Drawing Sheets

CURRENT INJECTION CIRCUIT FOR DELAYING THE FULL OPERATION OF A POWER FACTOR CONTROL CIRCUIT FOR AC INDUCTION MOTORS

FIELD OF THE INVENTION

The present invention relates generally to AC induction motors, and more particularly to a current injection circuit that causes a power factor control circuit to apply about the maximum voltage available form a power source to an AC induction motor for a predetermined amount of time until pressure associated with the AC induction motor has stabilized, after which the power factor control circuit returns to full operation.

BACKGROUND OF THE INVENTION

The difference in phase between the voltage supplied to an induction motor and the resulting current through the motor, known as the power factor, is indicative of the load on the motor. It is known for a power control system to be connected to a motor in order to detect and compare the supplied-voltage and resulting-current signals. Based upon this comparison, the power control system may control the voltage applied to the motor, which in turn controls the flow of current to the motor, in order to reduce the power consumed by a less than fully loaded motor.

U.S. Pat. No. 4,266,177 to Nola, for example, describes a power control circuit for an induction motor (hereinafter "the Nola '177 circuit"), which is incorporated herein by reference in its entirety, wherein a servo loop is used to control the voltage applied to the motor, which in turn controls the flow of current to the motor, in order to reduce the power consumed by the motor. In particular, a pulse signal is used to control the "on" time of a triac which is in circuit with the motor in order to maintain motor operation at a selected power factor. The pulse signal is based upon the measured current-voltage phase angle.

Certain power factor controllers of the prior art, such as the Nola '177 circuit, use an integrator as part of the processing required to produce the pulse signal. Typically, the integrator includes an operational amplifier and a filter which includes a capacitor and provides a single path of feedback from the output of the operational amplifier to one of the inputs of the operational amplifier. A command signal circuit is also connected to one of the inputs of the operational amplifier, which is typically the same input to which the filter is connected. Conventionally, the command signal circuit contains a potentiometer. The potentiometer must be adjusted for the particular motor being controlled in order to provide a proper bias voltage to the operational amplifier. In effect, the potentiometer sets a selected power factor (or phase angle between current and voltage) as determined by the greatest power factor (smallest motor current-voltage phase difference) at which the motor will operate over a range of loadings to be encountered. The resulting control signal is a negative signal which shifts positively responsive to the presence of a higher than commanded power factor, and shifts negatively when there is detected a lower than commanded power factor. It is employed in a servo loop to vary the applied voltage and control the input power to the motor. In this way, the motor is forced to operate at the selected power factor. In such circumstances, power factor controllers of the Nola '177 circuit variety enable motors which are less than fully loaded to draw significantly reduced power.

Power factor controllers require a power supply in order to provide an operating bias voltage of, for example, 15 volts, to the controller's active components, such as the operational amplifier of the integrator, so that the pulse signal is provided to the triac. Exemplary transformer-less power supplies are employed. However, in such cases, relatively large capacitors are typically necessary, and this slows full voltage output and start-up time of the circuitry. This in turn may prevent a motor from having a sufficient starting voltage (average voltage through a triac) initially applied to it for effective starting. To compensate for this, a delay circuit is employed which delays any power from being applied to motor until operating biases are essentially at full operating levels.

Unfortunately, the delays provided by such delay circuits may be too short during times of high temperature stresses, as would occur during summer months for air conditioning system and refrigeration systems. In such circumstances, the voltage supplied by the power company is lowered in response to the heavy loads produced by the very same air conditioning systems. The voltage supplied by the power companies is lowered to just above the level of adequate operation of such systems. Further, these air conditioning and refrigeration systems need even more time for the pressures in the compressor portion of such systems to stabilize and for back pressures to have been eliminated. It is possible that the motor may stall. In such circumstances, it is necessary to apply full voltage repeatedly until the air conditioning system and refrigeration system, including the motor, completely stabilizes. The time necessary for pressures to stabilize in most AC induction motors used in refrigeration systems may vary between 1 and 60 seconds.

Accordingly, what would be desirable, but has not yet been provided, is a system for delaying the operation of energy savings/power factor controller, such as the Nola '177 circuit, or conversely causing such circuits to apply maximum available supply voltage for a longer period of time that has been previously provided until the system employing the AC induction motor has stabilized.

SUMMARY OF THE INVENTION

The above-described problems are addressed and a technical solution is achieved in the art by providing an energy saver delay circuit for an induction motor, comprising: a power factor control circuit including an integrator having a negative summing junction; and a current injection circuit electrically connected to the negative summing junction, wherein the current injection circuit injects an offset current into the negative summing junction to cause about the maximum available voltage from a power source to be supplied to the motor for a predetermined amount of time.

According to an embodiment of the present invention, the current injection circuit may be triggered by voltage applied to the motor, wherein the voltage exceeds a predetermined value. The current injection circuit may be retriggered to cause full voltage to be supplied to the motor for a predetermined amount of time responsive to AC power being cycled off and on. In this embodiment, the current injection circuit comprises a programmable timer and a current injection resistor electrically connected to the programmable timer and to the negative summing junction, wherein the programmable timer supplies current through the current injection resistor for the predetermined amount of time. The programmable timer may be configured to reset and count for the predetermined amount of time on power up.

According to an embodiment of the present invention, the current injection circuit may be triggered by current flowing through the motor, responsive to the current exceeding a predetermined threshold current. The current injection circuit may be retriggered to cause full voltage to be supplied to the motor for a predetermined amount of time responsive to the current falling below and then re-exceeding the predetermined threshold current. In this embodiment, the current injection circuit comprises an amplifier circuit configured to measure the voltage across a current sensing resistor that senses current through the motor, and to convert the sensed current to an amplified voltage; a half-wave rectifier circuit electrically connected to an output of the amplifier circuit and configured to output a first value when the amplified voltage is of one polarity, and to output a second value when the amplified voltage is of another polarity; a comparator circuit electrically connected to an output of the positive half-wave rectifier circuit and configured to square an output waveform of the positive half-wave rectifier circuit responsive to the current though the motor exceeding the predetermined threshold current; and a programmable timer electrically connected to an output of the comparator circuit, the programmable timer including a current injection resistor between the programmable timer and the negative summing junction. The programmable timer supplies current continuously through the current injection resistor when the sensed current exceeds the predetermined threshold current, and supplies current for a predetermined amount of time when the sensed current falls below the predetermined threshold current.

According to an embodiment of the present invention, the current injection circuit may be triggered by voltage across the power factor control circuit, responsive to the voltage exceeding a predetermined threshold voltage. The current injection circuit may be retriggered to cause full voltage to be supplied to the motor for a predetermined amount of time responsive to the voltage across the power factor control circuit falling below and then re-exceeding the threshold voltage. In this embodiment, the current injection circuit comprises: a half-wave rectifier circuit electrically connected across the power factor control circuit and configured to rectify an AC voltage across the power factor control circuit and to reduce the peak voltage to within the operating voltage range of the current injection circuit; a comparator circuit electrically connected to an output of the half-wave rectifier circuit and configured to square an output waveform of the half-wave rectifier circuit responsive to the voltage across the power factor control circuit exceeding the predetermined threshold voltage; and a programmable timer electrically connected to an output of the comparator circuit, the programmable timer including a current injection resistor between the programmable timer and the negative summing junction. The programmable timer supplies current supplies current for a predetermined amount of time when the voltage across the power factor control circuit exceeds and then falls below the predetermined threshold voltage.

Alternatively, the above-described problems are addressed and a technical solution is achieved in the art by providing a power factor control circuit for an induction motor, comprising: a voltage/current phase difference generator for determining a difference in phase between a voltage applied to the motor and a current drawn by the motor, and for generating a phase difference signal as a function of the determined difference in phase, the voltage/current phase difference generator including an integrator, the integrator receiving the phase difference signal and generating an error signal for controlling an amount of power supplied to the motor as a function of the phase difference signal, the integrator having a negative summing junction; and a current injection circuit electrically connected to the negative summing junction, wherein the current injection circuit injects an offset current into the negative summing junction to cause about the maximum available voltage from a power source to be supplied to the motor for a predetermined amount of time. According to this embodiment, current injection may be triggered by voltage being applied to the motor, wherein the voltage exceeds a predetermined value. Alternatively, current injection may be triggered by current flowing through the motor, responsive to the current exceeding a predetermined threshold current. Alternatively, current injection may be triggered by voltage across the power factor control circuit, responsive to the voltage exceeding a predetermined threshold voltage.

Alternatively, the above-described problems are addressed and a technical solution is achieved in the art by providing method for controlling a power factor control circuit for an induction motor, the power factor control circuit including an integrator, the integrator having a negative summing junction, comprising the step of injecting an offset current into the negative summing junction to cause about the maximum available voltage from a power source to be supplied to the motor for a predetermined amount of time. The method may further comprise the step of triggering said injecting when the voltage being applied to the motor exceeds a predetermined value. The method may further comprise the step of retriggering said injecting responsive to AC power being cycled off and on.

According to an embodiment of the present invention, the step of triggering the injecting is responsive to current flowing through the motor exceeding a predetermined threshold current. The method may further comprise the step of retriggering said injecting responsive to the current falling below and then re-exceeding the predetermined threshold current.

According to an embodiment of the present invention, the step of triggering the injecting is responsive to voltage across the power factor control circuit exceeding a predetermined threshold voltage. The method may further comprise the step of retriggering said injecting responsive to responsive to the voltage across the power factor control circuit falling below and then re-exceeding the threshold voltage.

BRIEF DESCRIPTION OF THE DRAWINGS

The present invention will be more readily understood from the detailed description of exemplary embodiments presented below considered in conjunction with the attached drawings, of which.

It is to be understood that the attached drawings are for purposes of illustrating the concepts of the invention and may not be to scale.

DETAILED DESCRIPTION OF THE INVENTION

Figure 1:
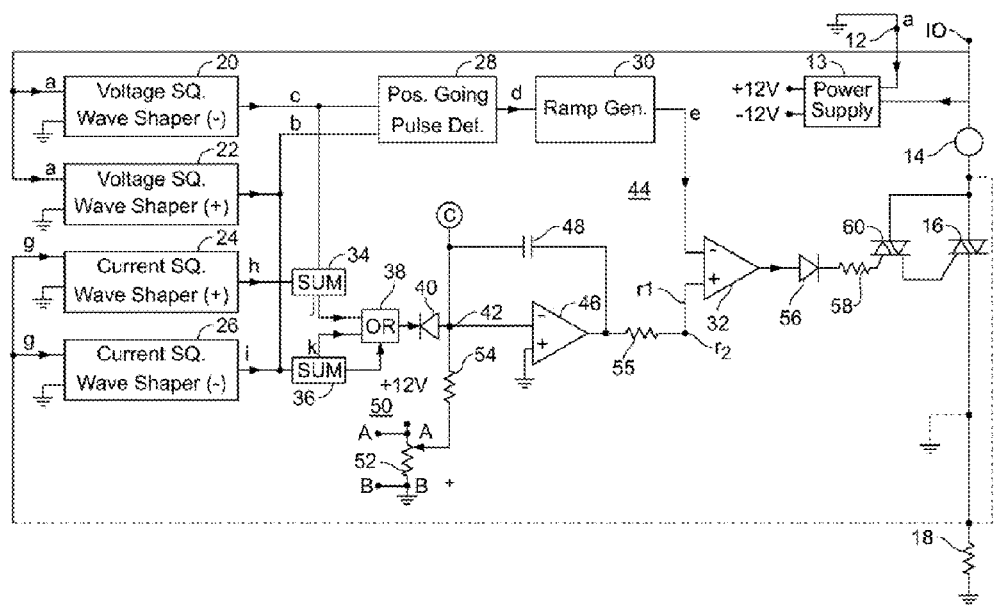
FIG. 1 is a partial schematic/block diagram of a modified version of the Nola '177 circuit, according to an embodiment of the present invention.

FIG. 1 is a combination electrical block/schematic diagram of a modified Nola '177 circuit 2, according to an embodiment of the present invention. An alternating current source is connected across terminals 10 and 12, which applies voltage/current to a circuit bias supply 13 and across a series circuit including a winding or windings of a motor 14, a triac 16, and an optional current sensing resistor 18. The input voltage signal is also applied to voltage squaring wave shapers 20 and 22, shaper 22 providing a first phased, full wave, rectangular wave output as shown in waveform (b) of FIG. 2; and voltage squaring wave shaper 20 providing an oppositely phased, full wave, rectangular wave output as shown in waveform (c) of FIG. 2. A signal voltage across the triac 16, shown as waveform (g) in FIG. 2, and representative of motor current, is applied to the inputs of full wave current squaring wave shapers 24 and 26, shaper 24, being responsive only to the positive half cycle of current waveform (d), providing a first phased, full wave, rectangular wave output as shown in waveform (h) of FIG. 2. Wave shaper 26, being responsive only to the negative half cycle of current waveform (d), provides an oppositely phased, full wave, rectangular wave output as shown in waveform (i) of FIG. 2. The bias outputs of the supply 13 satisfy the indicated bias requirements as well as generally supply bias power to all active elements in the Nola '177 circuit 2 by connections not shown.

Figure 2:
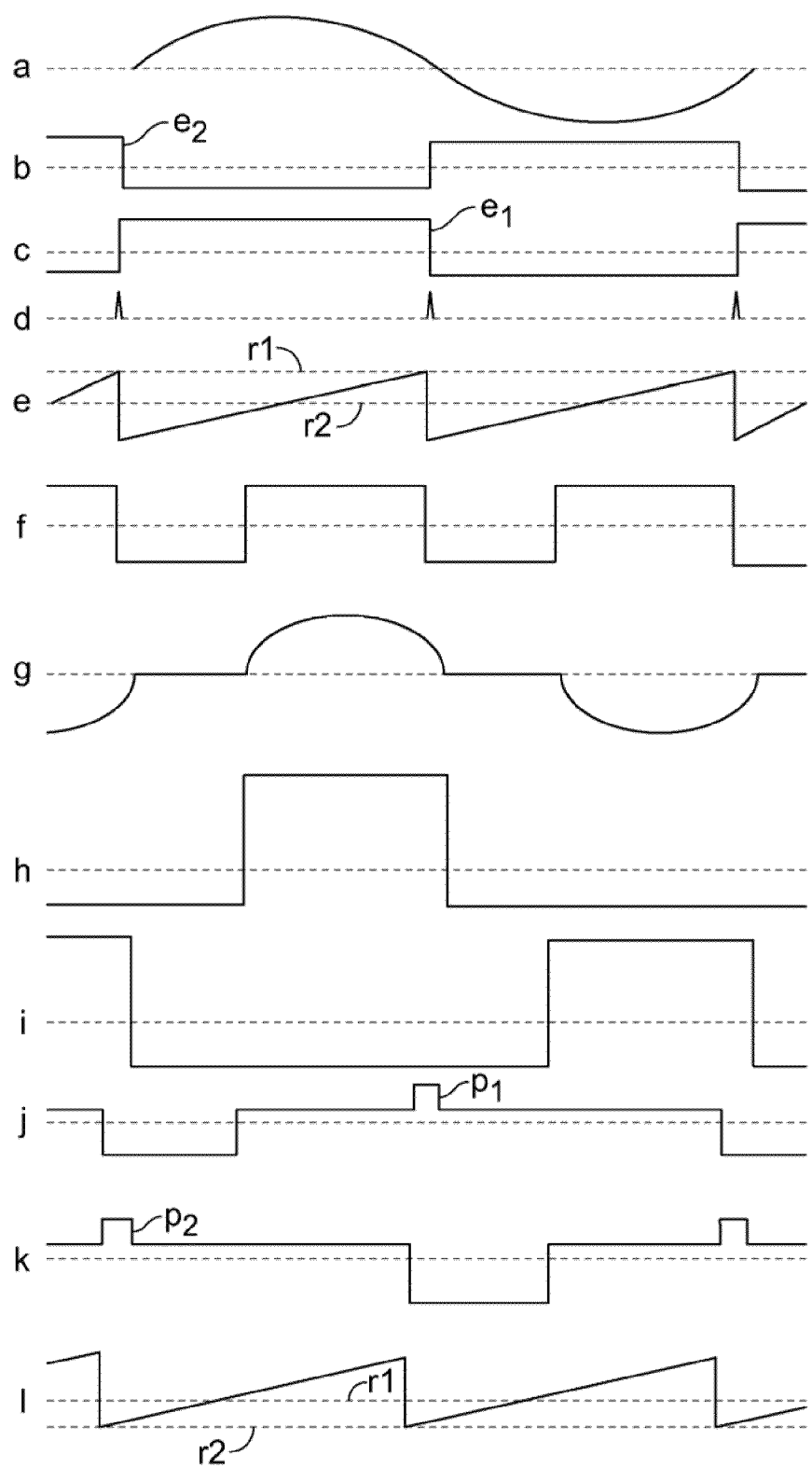
FIG. 2 shows a series of waveforms illustrating aspects of the operation of the circuit of FIG. 1.

An output of each of voltage square wave shapers 20 and 22 is fed to positive going pulse detector 28 which provides a positive spike output (waveform (d) of FIG. 2). The spike pulses are then fed to ramp generator 30 which provides a ramp waveform as shown in waveform (e) of FIG. 2. This ramp waveform is applied to the (−) (inverting) input of differential or operational amplifier 32, which functions as a zero crossing detector responsive to the combination of the ramp waveform and a control signal applied to the positive (non-inverting) input of the operational amplifier 32, as will be further explained.

The control signal is a function of phase difference between the current and voltage and a command signal. This phase difference, that is, the phase difference between the current and voltage applied to the motor 14, is detected each half cycle. Phase difference is detected by a selected combination of the outputs of square wave shapers 20, 22, 24, and 26. Thus, the outputs of the shapers 20 and 24 are summed in a summing device 34 to provide a signal output as shown in waveform (j) of FIG. 2, and the outputs of the wave shapers 22 and 26 are summed in a summing device 36 to provide an output as shown in waveform (k) of FIG. 2. As a result, each of the outputs of summing devices 34 and 36 provides superimposed pulses, pulses p1 (waveform j) and p2 (waveform k), which are of a duration representative of the phase difference between applied voltage to and current through the motor 14. This occurs because, in effect, the turn-off of a summed voltage square wave established the rise point of those superimposed pulses, and the trailing edge of the current derived square wave produces the trailing edges of the superimposed pulses.

As will be noted in waveforms (j) and (k), a superimposed pulse occurs each half cycle of the AC input. In order to use them both, the outputs of the summing devices 34 and 36 are fed to OR circuit 38 which presents both at its output. The output of the OR circuit 38 is fed through a rectifier 40 preparatory to integration, and there is applied at a summing junction 42 pulses p1 and p2 appearing each half cycle of signal voltage. They are of a constant height, but of variable width, width varying as a direct function of phase angle between current and voltage. Although pulses p1 and p2 are fed to the summing junction 42, they alone do not appear at this point as there are two other influential circuits connected to it. The first of these is an integrator 44. It functions to provide an averaged or integrated value for pulses p1 and p2, which thus converts the pulse width modulated pulses to an amplitude modulated signal.

The integrator 44 comprises an operational amplifier 46 and a capacitor 48, the inverting input of an operational amplifier 46 being connected to the summing junction 42, and a capacitor 48 being connected between this point and the output of the operational amplifier 46.

A third circuit connected to the summing junction 42 is command signal circuit 50 comprising a potentiometer 52, across which is connected a positive 12 volts source. This circuit is connected to the summing junction 42 via a resistor 54 and provides a bucking (opposite polarity) voltage to that provided by the amplitude of the detected phase difference signal. The (+) or non-inverting input of the operational amplifier 46 is connected to a ground reference.

A command signal from the command signal circuit 50 is set with the motor 14 unloaded and by adjustment of the potentiometer 52. In effect, the command signal sets a selected power factor (or phase angle between current and voltage) as determined by the greatest power factor (smallest motor current-voltage phase difference) at which the motor will operate over a range of loadings to be encountered. The command signal, which appears at the output of the operational amplifier 46, is a positive signal which shifts negatively responsive to the presence of a higher than commanded power factor, and shifts positively when there is detected a lower than commanded power factor. It is employed in a servo loop to vary the applied voltage and control the input power to the motor 14. In this way, the motor 14 is forced to operate at the selected power factor. In a typical case, it might be found that without the present control, the motor would operate with a power factor of 0.75 when fully loaded and a power factor of 0.15 when unloaded, but that with the control system of this invention, it may be operated at a relatively constant power factor of 0.85 regardless of loading conditions. In such circumstances, this enables motors which are less than fully loaded to draw significantly reduced power.

The control signal from the output of the operational amplifier 46 is coupled through a resistor 55 and is applied to the positive (non-inverting) input of the operational amplifier 32, operating as a zero crossing detector. This control signal has the effect of varying the response of the operational amplifier 32 to the ramp signal shown in waveform (e) and which is applied to the negative or inverting input of the operational amplifier 32. Thus, with a basically zero level of control signal, represented by reference r1, being in the top position, the operational amplifier 32 would be essentially fully held positive by the ramp signal, resulting in a triggering output from the operational amplifier 32 which stays on. As a typical value of positive control signal, represented by reference r2, the relative position of reference r2 with respect to the ramp signal is such that the operational amplifier 32 will be triggered on during the latter portion of each ramp signal, commencing with the intersecting of the ramp signal with reference line r2. This produces a positive pulse output from the operational amplifier 32 as indicated in waveform (f) shown with approximately 50% "on" time. The output of the operational amplifier 32 is applied through a diode 56 and a resistor 58 to the gate input of a triggering or buffer triac 60, and its output is connected to the trigger input of the triac 16 which is in circuit with the motor 14. Accordingly, as shown, the triac 16 is turned on each cycle for the pulse width of the positive pulse shown in waveform (f) for about 50% of the time of each half cycle of the AC input to the motor 14. This state would typically occur for a medium loading of the motor 14. If motor load should increase, this would be detected by a decreased phase angle; and in correcting this, the feedback system of the circuit would raise the control voltage and increase the turn-on time of the triac 16. If the motor load is shifted downward, the opposite would occur, and turn-on time of the triac 16 would be reduced. The net result is that when the motor 14 is less than fully loaded, it is driven by a substantially lower average voltage, and thereby draws substantially less power than were the circuit 2 not employed.

Figure 3:
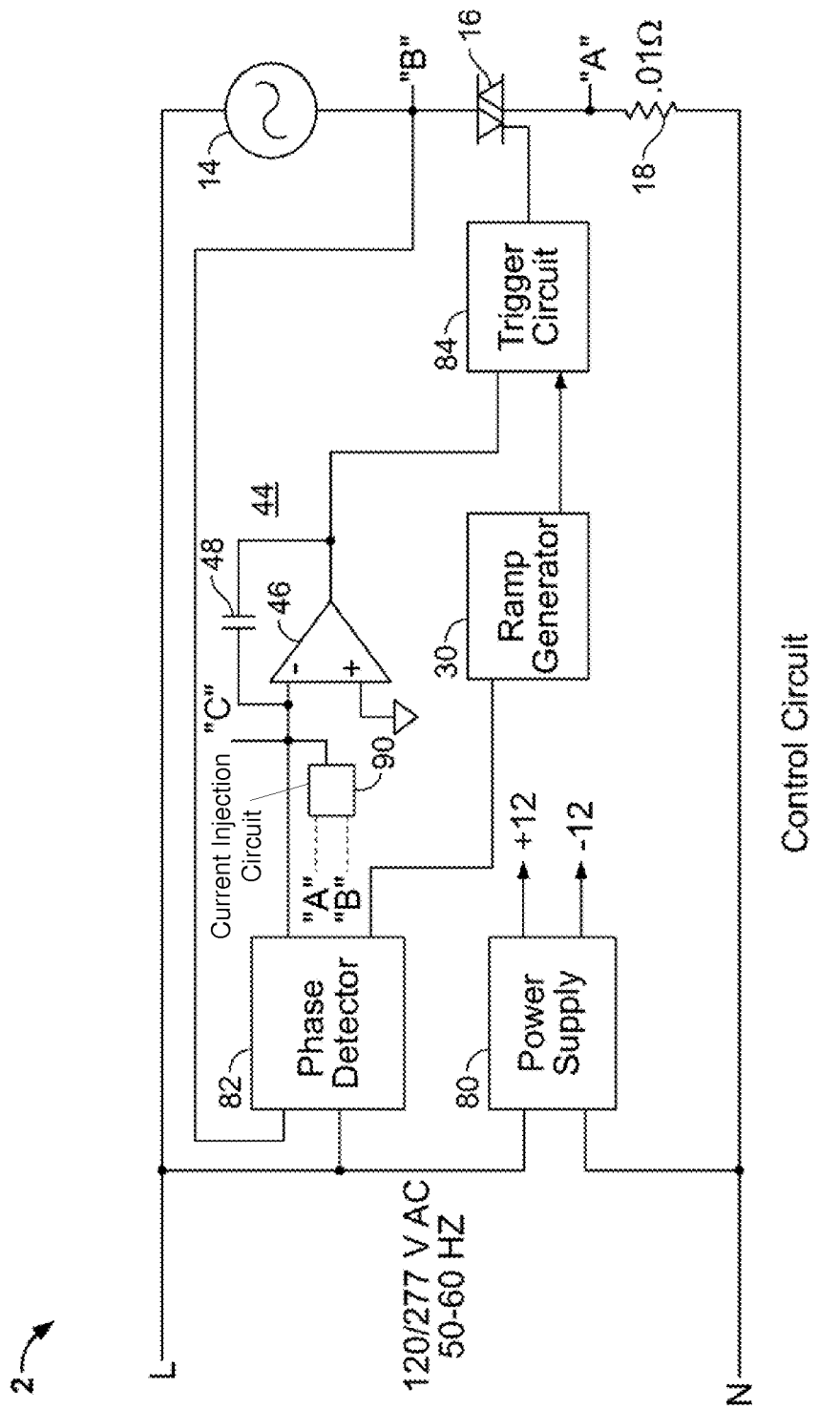
FIG. 3 is a block diagram depicting major elements of a power factor control circuit that employs the modified Nola '177 circuit of FIG. 1 and indicating input and output points for modification to the operation of the modified Nola '177 circuit of FIG. 1 via a current injection circuit, according to exemplary embodiments of the present invention.

FIG. 3 is a block diagram depicting major elements of the power factor control circuit 2 that employs the modified Nola '177 circuit of FIG. 1 and indicating input and output points for modification to the operation of the modified Nola '177 circuit of FIG. 1 via a current injection circuit, according to exemplary embodiments of the present invention. FIG. 4 depicts block diagrams of the power factor control circuit 2 of FIG. 3 modified with exemplary embodiments of a current injection circuit 90. Referring now to FIGS. 3 and 4, the power factor control circuit 2 is coupled to line (L) and neutral (N) power leads of an AC power source, which may be, but is not limited to 120 or 277 Volts AC operating at 50 or 60 Hertz. The motor 14 is coupled to both the power factor control circuit 2 at point "B" and to the line power lead "L" of the AC power source. A positive and negative power supply 80 (+−12V DC in a preferred embodiment) for the operation of the control circuit 2 is derived from the line "L" and neutral "N" leads of the AC power source. A phase detection circuit 82 is coupled to point "B" and the line power lead "L." The phase detector circuit 82 includes the shapers 20-26, summers 34-36, OR module 38, diode 40, and negative going pulse detector 28 of FIG. 1. The phase detector circuit 82 is coupled to the ramp generator 30 and the integrator 44, the integrator including the operational amplifier 46 and the capacitor 48 of FIG. 1. The capacitor 48 is coupled to the negative summing junction, labeled "C" of the operational amplifier 46. The integrator 44 and the ramp generator 30 are coupled to a trigger circuit 84, the trigger circuit 84 including the operational amplifier 32, the diode 56, the resistor 58, and the triac 60 of FIG. 1. The trigger circuit serves to apply a trigger current to the gate lead of the triac 16, which controls the relationship between current and voltage, i.e., the power factor, of the motor 14. The current sensing resistor 18 is coupled to the neutral lead "N" (i.e., ground) and one end of the triac 16 at point "A." The current sensing resistor 18 permits the measurement of current through the motor 14, also known as the compression lock motor current, via point "A" and the neutral lead "N". Point "B" allows for a measurement of the voltage across the triac, i.e., across the power factor control circuit 2.

The current injection circuit 90 is configured to inject a current, preferably a DC current, into the negative summing junction at point "C" of the operational amplifier 46 for a predetermined amount of time, thereby causing the causes the trigger circuit 84 to continuously trigger the triac 16, so that the full output voltage of the power factor control circuit 2 is applied to the motor 14 for a predetermined amount of time after which the injection current is removed and, as a result, the power factor control circuit 2 enters an energy saving mode. According to certain embodiments of the present invention, the current injection circuit 90 may be responsive to or "triggered" by the application of power to the power factor control circuit 2 and the current injection circuit 90, the sensing of current at point "A," or the sensing of voltage at point "B," as described hereinbelow in connection with FIGS. 4A-4C, respectively.

Figure 4A:
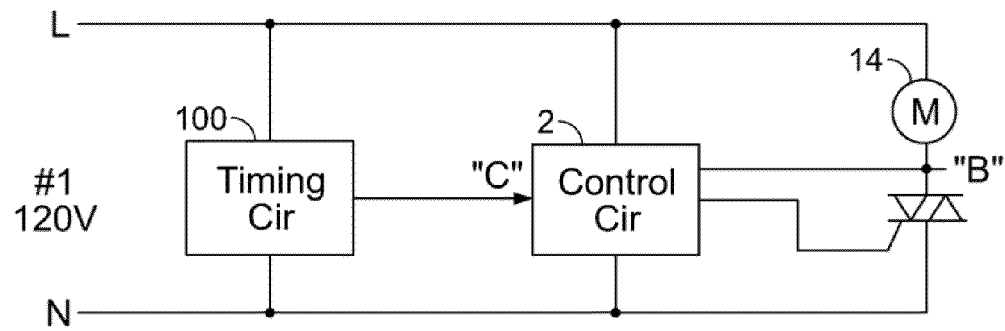
FIG. 4A depicts a block diagram of the power factor control circuit of FIG. 3 modified by a current injection circuit responsive to the application of power, according to an embodiment of the present invention.

Referring now to FIGS. 3 and 4A, according to an embodiment of the present invention, a current injection/timing circuit 100 is coupled to the point "C" negative summing junction of the integrator 44, responsive to AC power applied to the line lead "L" and the neutral lead "N" of an AC power source. The current injection circuit 100 operates in a "one-shot" mode. In a preferred embodiment, the current injection circuit 100 is triggered on power up, which, in a preferred embodiment, occurs when the magnitude of the input voltage exceeds about 95 V for a 120 V AC power source. The current injection circuit 100 injects an offset current into point "C" of the integrator 44. This causes the trigger circuit 84 to continuously trigger the triac 16, so that the full output voltage of the power factor control circuit 2 (i.e., approximately the maximum available voltage from the AC input power source, which is about the voltage of the AC input power source minus the voltage across the triac 16 minus the voltage across the optional resistor 18) is applied to the motor 14 for a predetermined amount of time after which the power factor control circuit 2 enters the energy saving mode.

In most air conditioning and refrigeration systems, AC power is cycled on and off periodically. In such circumstances, the current injection circuit 100 is re-triggered so that the power factor control circuit 2 re-operates at full voltage for a predetermined amount of time whenever power is resupplied to the AC induction motor. The time delay of the current injection circuit 100 should be greater than the worst case stabilization time of refrigeration and air conditioning compressors. In a preferred embodiment, the delay time of the current injection circuit 100 is set to about 15 seconds, but in other embodiments may range between about 0 seconds and about 60 seconds.

Figure 4B:
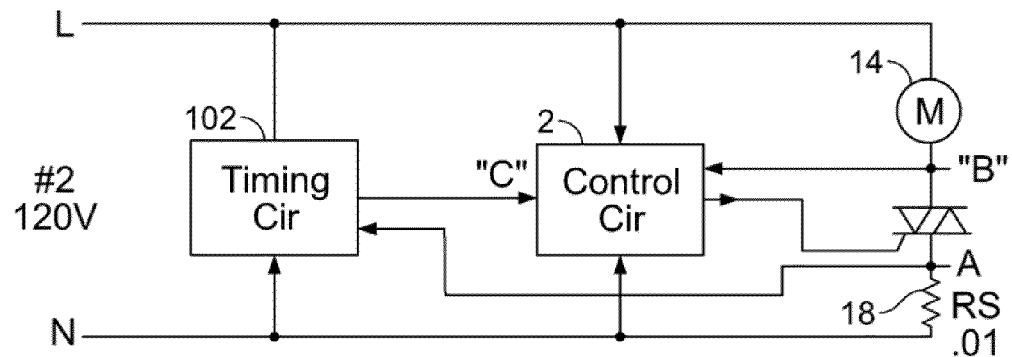
FIG. 4B depicts a block diagram of the power factor control circuit of FIG. 3 modified by a current injection circuit responsive to the sensing of motor current, according to an embodiment of the present invention.

Referring now to FIGS. 3 and 4B, according to an embodiment of the present invention, a current injection/timing circuit 102 is coupled to the point "C" negative summing junction of the integrator 44, to point "A," and to AC power applied to the line lead "L" and the neutral lead "N" of an AC power source. The current injection circuit 102 operates in a "one-shot" mode. In a preferred embodiment, the current injection circuit 102 is triggered when the current through the motor 14 exceeds a predetermined level as measured across the current sensing resistor 18 at points "A" and "N." The current injection circuit 102 injects an offset current into point "C" of the integrator 44. This causes the trigger circuit 84 to continuously trigger the triac 16, so that the full output voltage of the power factor control circuit 2 is applied to the motor 14 for a predetermined amount of time, after which the power factor control circuit 2 enters the energy saving mode. If the motor 14 should happen to subsequently stall, motor current rises (resulting in an increased voltage at point "A"). If the motor current again exceeds the same predetermined level, the current injection circuit 102 injects an offset current into point "C" of the integrator 44, thereby causing the power factor control circuit 2 to apply full voltage to the motor 14 for the same predetermined amount of time, after which the power factor control circuit 2 enters the energy saving mode. This process may be repeated as necessary until the motor 14 completely stabilizes.

Figure 4C:
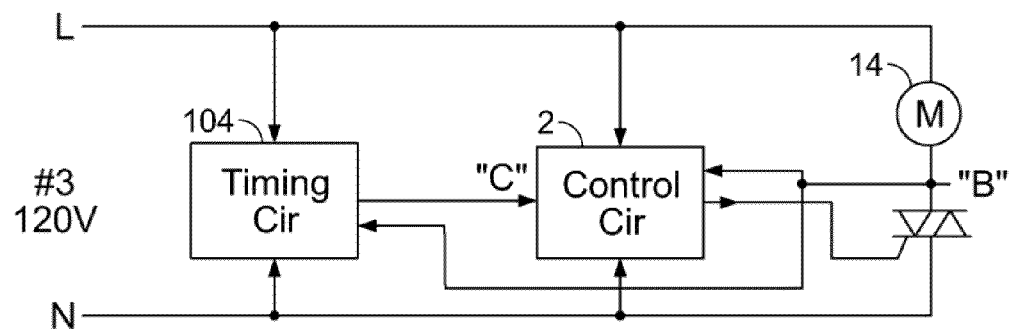
FIG. 4C depicts a block diagram of the power factor control circuit of FIG. 3 modified by a current injection circuit responsive to the sensing of a voltage across the power factor control circuit, according to an embodiment of the present invention.

Referring now to FIGS. 3 and 4C, according to an embodiment of the present invention, a current injection/timing circuit 104 is coupled to the point "C" negative summing junction of the integrator 44, to point "B," and to AC power applied to the line lead "L" and the neutral lead "N" of an AC power source. The current injection circuit 104 operates in a "one-shot" mode. In a preferred embodiment, the current injection circuit 104 is triggered when the voltage across the power factor control circuit 2 exceeds a predetermined level as measured across points "B" and "N." The current injection circuit 104 injects an offset current into point "C" of the integrator 44. This causes the trigger circuit 84 to continuously trigger the triac 16, so that the full output voltage of the power factor control circuit 2 is applied to the motor 14 for a predetermined amount of time, after which the power factor control circuit 2 enters the energy saving mode. If the motor 14 should happen to subsequently stall, the voltage across the power factor control circuit 2 at point "B" rises. If the voltage across the power factor control circuit 2 again exceeds the same predetermined level, the current injection circuit 104 injects an offset current into point "C" of the integrator 44, thereby causing the power factor control circuit 2 to apply full voltage to the motor 14 for the same predetermined amount of time, after which the power factor control circuit 2 enters the energy saving mode. This process may be repeated as necessary until the motor 14 completely stabilizes.

Figure 5:
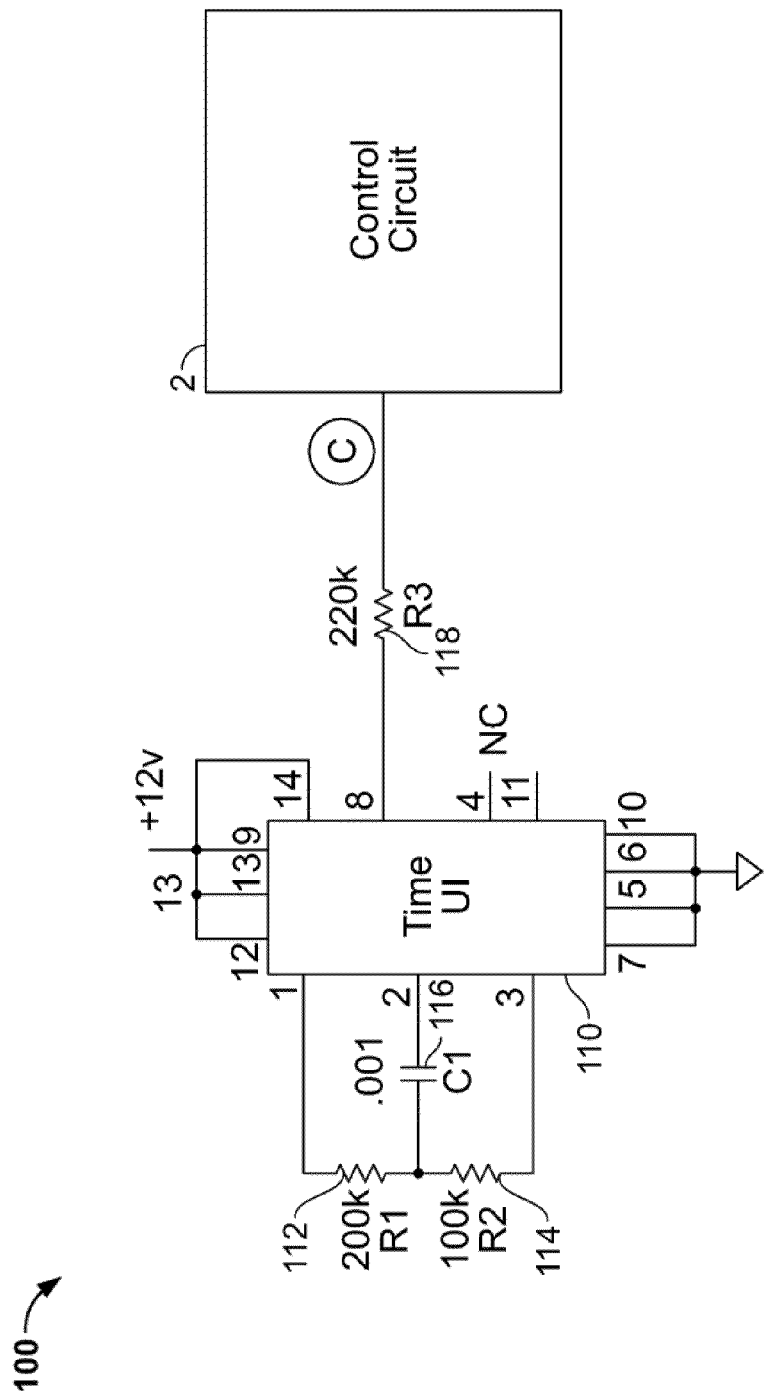
FIG. 5 is a detailed electrical schematic diagram of the current injection circuit of FIG. 4A, according to an embodiment of the present invention.

FIG. 5 is a detailed electrical schematic diagram of the current injection circuit 100 of FIG. 4A, according to an embodiment of the present invention. The current injection circuit 100 includes an MC14561 programmable timer 110, a 200K ohms timing resistor 112, a 100K ohms timing resistor 114, a 0.001 µF timing capacitor 116, and a 220 K ohms current injection resistor 118. The auto reset pin 5 of the programmable timer 110 is set to a low state (ground potential) so that the programmable timer 110 is initialized by turning on power. The master reset pin 6 of the programmable timer 110 is set to a low state for "timer operational." The mode pin 10 is set to a low state so that the programmable timer 110 operates in "one-shot" mode. The timer select input pins 12 and 13 are set to is set a high state (+12 volts) so that the output pin 8 enters a high (about 12 volts) state for $2^{16}$ counts at a frequency $$T = \frac{1}{2.3(100 \text{ Kohms})(0.001 \text{ }\mu\text{F})}$$

or 15 seconds. Since point "C" is a virtual ground, the injection current is about $$\frac{12 \text{ volts}}{220 \text{ Kohms}} \approx 54.5 \text{ }\mu\text{A}.$$

In operation, when power (+12 volts) is applied to the programmable timer 110 (as a result of the application of AC power applied to the line lead "L" and the neutral lead "N"), the power-on-reset function of the programmable timer 110 is activated. Pin 8 of the programmable timer 110 enters a high state. This causes a current to flow through the current injection resistor 118, which generates an offset current in the power factor control circuit 2. As a result, a maximum amount of voltage is applied to the motor 14. After a predetermined amount of time determined by the timing resistor 112, the timing resistor 114, and the timing capacitor 116 (15 seconds), the output at pin 8 of the programmable timer 110 transitions to a low state. As a result, the power factor control circuit 2 enters the energy saving mode.

Figure 6:
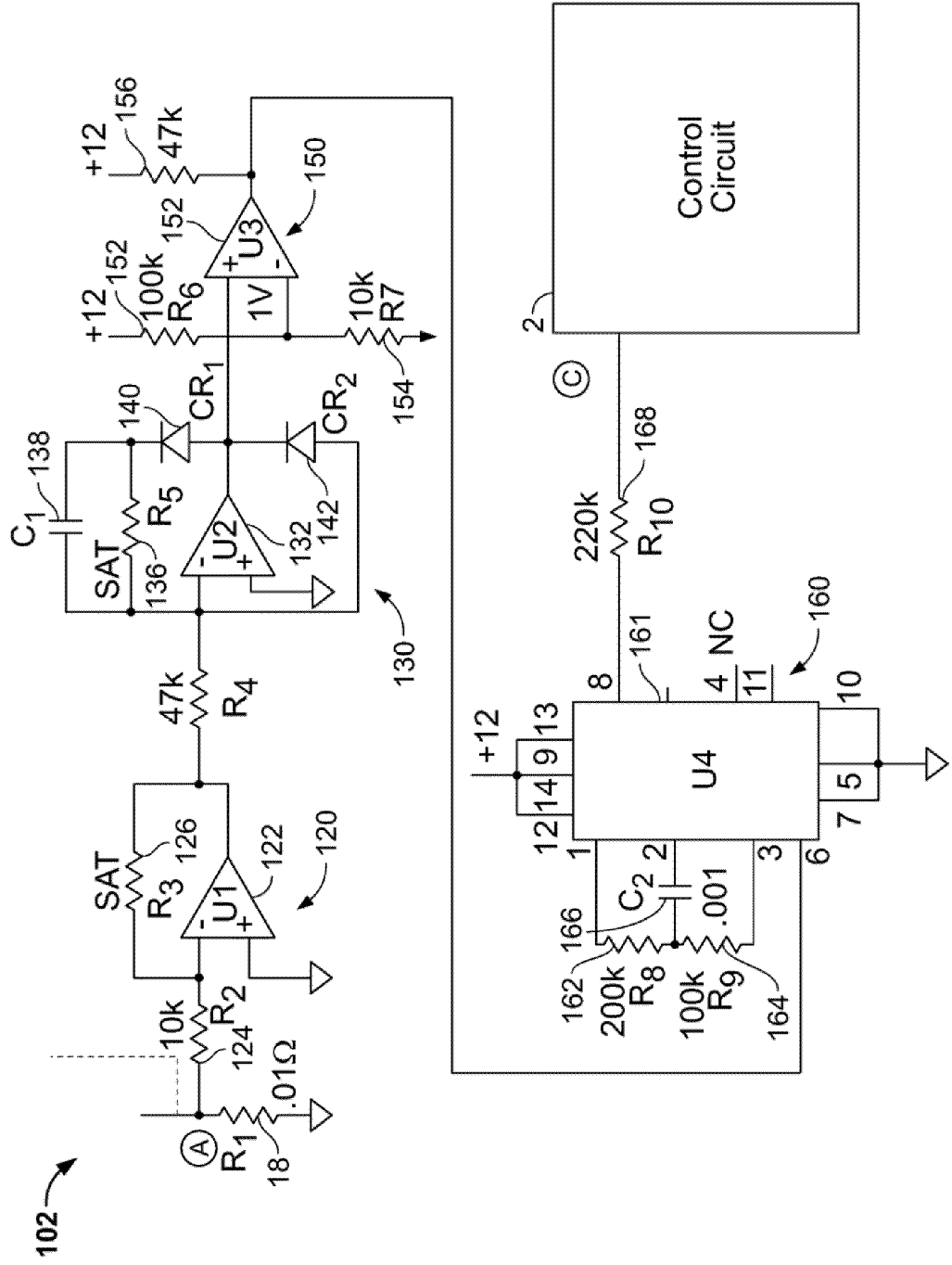
FIG. 6 is a detailed electrical schematic diagram of the current injection circuit of FIG. 4B, according to an embodiment of the present invention.

FIG. 6 is a detailed electrical schematic diagram of the current injection circuit 102 of FIG. 4B, according to an embodiment of the present invention. The current injection circuit 102 includes an amplifier circuit 120, a positive half-wave rectifier circuit 130, a comparator circuit 150, and a programmable timer 160, connected as shown. The amplifier circuit 120 includes an operational amplifier 122, a 10 K ohms resistor 124, and a resistor 126 of value SAT. One terminal of the resistor 124 is coupled to point "A" of FIG. 4B so as to sense the current through current sensing resistor 18. The other terminal of the resistor 124 is coupled to the negative summing junction of the operational amplifier 122. The positive summing junction of the operational amplifier 122 is connected to ground potential, i.e., the neutral lead "L" of FIG. 4B. One terminal of the resistor 126 is connected to the positive summing junction of the operational amplifier 122 and to one terminal of the resistor 124. The other terminal of the resistor 126 is connected to the output of the operational amplifier 122. The gain of the amplifier circuit 120 is set by the ratio of the value of the resistor 126 to the value of the resistor 124, or $$-\frac{R_3}{R_2} = -\frac{SAT}{R_2} = -\frac{SAT}{10 \text{ K}}.$$

The output of the operational amplifier 122 is connected to a positive half-wave rectifier circuit 130. The positive half-wave rectifier circuit 130 includes an operational amplifier 132, a 47 K ohm resistor 134, a resistor 136 of value SAT, a capacitor 138, a diode 140, and a diode 142. One terminal of the resistor 134 is connected to the output of the operational amplifier 122. The other terminal of the resistor 134 is connected to the negative summing junction of the operational amplifier 132. The positive summing junction of the operational amplifier 132 is connected to ground potential, i.e., the neutral lead "L" of FIG. 4B. One terminal of the resistor 136 is connected to the negative summing junction of the operational amplifier 132 and the resistor 134, while the other terminal of the resistor 136 is connected to the cathode of the diode 140. The capacitor 138 is connected in parallel across the resistor 136, which functions to filter out high frequency noise. The anode of the diode 140 is connected to the output of the operational amplifier 132, and to the cathode of the diode 142. The anode of the diode 142 is connected to the negative summing junction of the operational amplifier 132.

When a negative voltage is applied between the resistor 134 and ground potential, the diode 140 conducts, thereby causing a positive-going voltage to be output by the operational amplifier 132. In such circumstances, the gain of the positive half-wave rectifier circuit 130 is set by the ratio of the value of the resistor 136 to the value of the resistor 134, or $$\frac{R_5}{R_4} = \frac{SAT}{R_4} = \frac{SAT}{47\ K}.$$

When a positive voltage is applied between the resistor 134 and ground, the diode 142 conducts, thereby amplifying the input voltage with a gain of about $$\frac{1}{47\ K} \approx 0.$$

In such circumstance, the gain of the positive half-wave rectifier circuit 130 is approximately 0. As a result, for values of SAT above about (+12 volts)*47K ohms≈564K ohms, the output of the positive half-wave rectifier circuit 130 for an input 50 Hz or 60 Hz input current is a 12V half-wave rectified 50 Hz or 60 Hz approximate square wave, respectively.

Since the output of the positive half-wave rectifier circuit 130 is not a perfect square wave, the edges of the output signal of the positive half-wave rectifier circuit 130 are further "squared" by the comparator circuit 150. The comparator circuit 150 includes the operational amplifier 152, the 100K ohms resistor 154, the 10K ohms resistor 156, and the 47K ohms resistor 158. The positive terminal of the operational amplifier 152 is connected to the output of the operational amplifier 142. One terminal of the resistor 154 is connected to the positive power supply (+12 volts), while the other terminal of the resistor 154 is connected to the negative input terminal of the operational amplifier 154, and to one terminal of the resistor 156. The other terminal of the resistor 156 is connected to ground potential. One terminal of the resistor 158 is connected to the positive power supply (+12 volts), while the other terminal of the resistor 158 is connected to the output terminal of the operational amplifier 152.

In a preferred embodiment, the threshold voltage of the comparator circuit 150 is set by the voltage present at the negative input terminal of the operational amplifier 152 to about $$(+12\ V)\frac{10\ K}{10\ K + 1\ K} \approx 1\ V.$$

Thus, when a positive edge of the input approximate square wave exceeds about 1 volt, the output of the operational amplifier 152 enters a high state (about +12 volts), and likewise, when the output of a negative edge of the input approximate square wave falls below about 1 volt, the output of the operational amplifier 152 enters a low state (about 0 volts).

The programmable timer 160 includes an MC14561 programmable timer IC 161, a 200K ohms timing resistor 162, a 100K ohms timing resistor 164, a 0.001 μF timing capacitor 166, and a 200K ohms current injection resistor 168. The programmable timer IC 161 is configured almost identically to the programmable timer 110 of FIG. 5, except that the master reset pin 6 is controlled by the voltage output by the operational amplifier 152. The master reset pin 6 is configured to toggle between "timer operation" when the output of the operational amplifier 142 is "low" and "master reset on" when the output of the operational amplifier is "high." In "master reset on" mode, the counters of the programmable timer IC 161 are reset so as to output a "high" voltage on the output pin 8 until the voltage on the "master reset on" becomes "low," after which the programmable timer IC 161 outputs a high voltage for predetermined amount of time as set by the resistors 162, 164 and the capacitor 166.

In operation, the current sensing resistor 18 senses motor current. The input 50 or 60 Hz current sensed by the current sensing resistor 18 is converted to a voltage and amplified, rectified, and "squared" by the operations of the amplifier circuit 120, the positive half-wave rectifier circuit 130, and the comparator circuit 150, respectively. The +12 volt portions of the 50 Hz/60 Hz (20 msec/16.7 msec) square wave output by the comparator circuit 120 set the master reset pin 6 of the programmable timer IC 161 to "master reset on" mode, during which the output on pin 8 is set to a high state (about +12 volts), while the 0 volt portions of the of the 50 Hz/60 Hz square wave output by the comparator circuit 120 set the master reset pin 6 of the programmable timer IC 161 to "timer operational mode," during which the programmable timer IC 161 "counts" and the output at pin 8 is set to a low state (about 0 volts). Since the time constant and counter of the programmable timer IC 161 is about 15 seconds and is thus >> than the period of the 50/60 Hz input square wave present on the master reset pin 6, the programmable timer IC 161 continuously outputs a "high" signal on pin 8. This causes a current to flow through current injection resistor 168, which generates an offset current in the power factor control circuit 2. As a result, a maximum amount of voltage is applied to the motor 14. This offset current is continuously injected through the current injection resistor 168 as long as the motor current sensed in the resistor is above the predetermined threshold.

As a result of the application of full voltage across the motor 14, current in the motor 14 decreases, thereby reducing the voltage across the resistor 18. This reduces the voltage at the output of the amplifier circuit 120 and the half-wave rectifier circuit 130. If the peak value of the motor current falls below the predetermined threshold, as when the motor is fully operational, the output voltage of the comparator circuit 150 enter a low state, thereby setting pin 6 of the programmable timer IC 161 to a low state, or "timer operational mode." This causes the programmable timer IC 161 to output a high state (about +12 volts) on pin 8, thereby causing the current injection resistor 168 to inject current into point "C" of the power factor control circuit 2. The programmable timer IC 161 counts for a predetermined amount of time. After the predetermined amount of time expires, the output at pin 8 of the programmable timer IC 161 transitions to a low state. As a result, the power factor control circuit 2 enters the energy saving mode.

Should the motor begin to stall, the current in the motor will rise above the predetermined threshold, thereby retriggering the current injection circuit 102 to cause full voltage to be applied to the motor until about 15 seconds after the motor current falls below the predetermined threshold, and thus the cycle repeats as described above.

Figure 7:
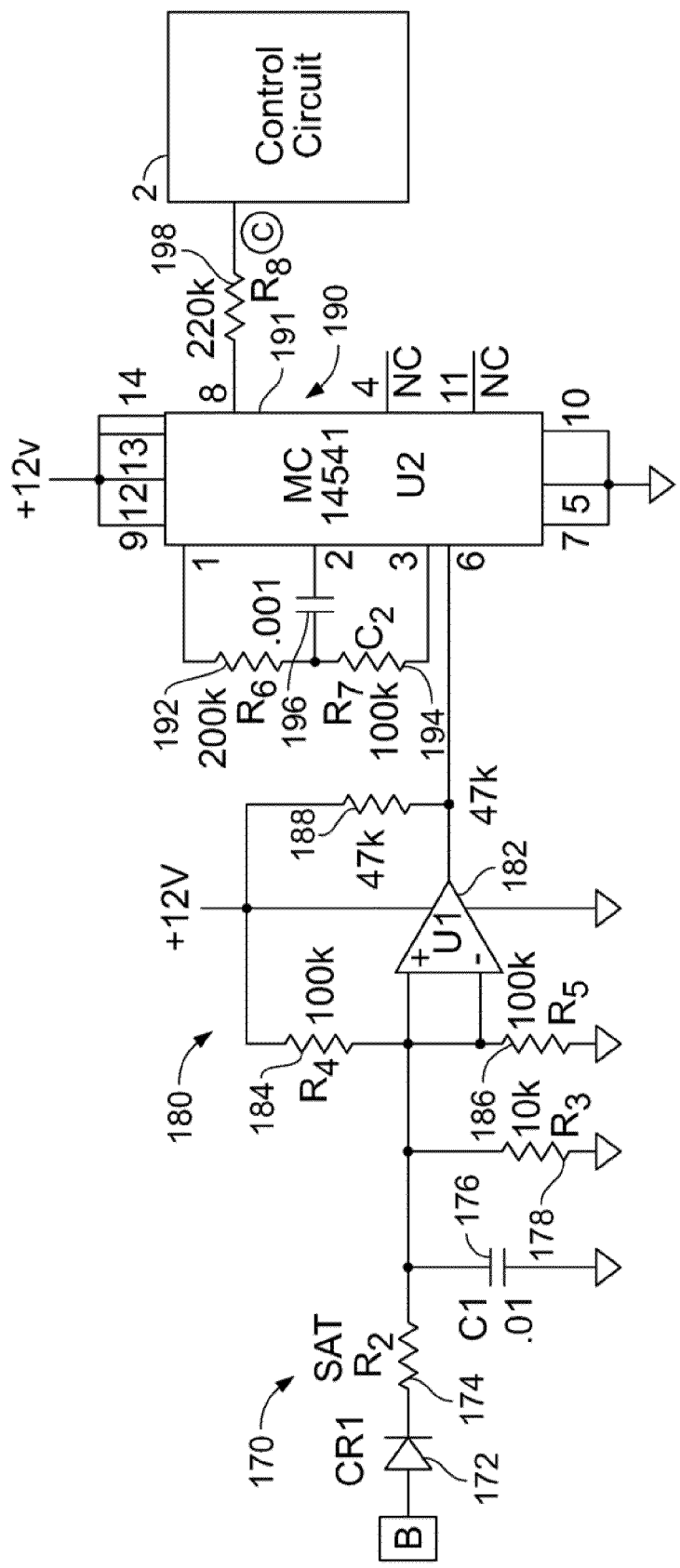
FIG. 7 is a detailed electrical schematic diagram of the current injection circuit of FIG. 4C, according to an embodiment of the present invention.

FIG. 7 is a detailed electrical schematic diagram of the current injection circuit 104 of FIG. 4C, according to an embodiment of the present invention. The current injection circuit 104 includes a half-wave voltage rectifier circuit 170, a comparator circuit 180, and a programmable timer 190, connected as shown. The half-wave voltage rectifier circuit 170 includes a diode 172, a resistor 174 of value SAT a 0.01 μF capacitor 176, and a 10K ohms resistor 178. The anode of the diode 172 is coupled to point "B" of FIG. 4C so as to sense the voltage across the power factor control circuit 2 between points "B" and "N." The cathode of the diode 172 is connected in series to one terminal of the resistor 174. The other terminal of the resistor 174 is connected to one terminal each of the capacitor 176 and the resistor 178. The other terminals of the capacitor 178 and the resistor 178 are connected to ground potential. The resistors 174, 178 form a voltage divider, while the capacitor 176 is a filter to reduce high frequency noise. The diode 172 half-wave rectifies an incoming 50 Hz/60 Hz voltage across the power factor control circuit 2 between points "B" and "N."

The comparator circuit 180 includes an operational amplifier 182, a 100K ohms resistor 184, a 100K ohms resistor 186, and a 47K ohms resistor 158. The positive terminal of the operational amplifier 182 is connected to a common junction of the resistors 184, 188 and the capacitor 186. One terminal of the resistor 184 is connected to the positive power supply (+12 volts), while the other terminal of the resistor 184 is connected to the negative input terminal of the operational amplifier 182, and to one terminal of the resistor 186. The other terminal of the resistor 186 is connected to ground potential. One terminal of the resistor 188 is connected to the positive power supply (+12 volts), while the other terminal of the resistor 188 is connected to the output terminal of the operational amplifier 182.

In a preferred embodiment, the threshold voltage of the comparator circuit 170 as set by the voltage present at the negative input terminal of the operational amplifier 182 to about $$(+12 \text{ V}) \frac{R_4}{R_4 + R_5} = (+12 \text{ V}) \frac{100 \text{ K}}{100 \text{ K} + 100 \text{ K}} \approx 6 \text{ V}.$$

In a preferred embodiment, the voltage across the power factor control circuit 2 between points "B" and "N" needs to exceed at least about 6 V to trigger the comparator circuit 180. Therefore, in a preferred embodiment, the value of the resistor 174 is determined by the equation $$(V_{*B*} - 0.7 \text{ V}) \frac{10 \text{ K}}{10 \text{ K} + SAT} > 6 \text{ V}$$

or SAT(K)>10V.$_{*B*}$.-7. Thus, when a positive-going edge of an input half-wave rectified sine wave input voltage present at the positive input terminal of the operational amplifier 182 exceeds about 6 volts, the output of the operational amplifier 182 goes to a high state (about +12 volts), and likewise, when the output of a negative-going edge of an input half-wave rectified sine wave input voltage present at the positive input terminal of the operational amplifier 182 falls below about 6 volts, the output of the operational amplifier 182 enters a low state (about 0 volts).

The programmable timer 190 includes an MC14561 programmable timer IC 191, a 200K ohms timing resistor 192, a 100K ohms timing resistor 194, a 0.001 µF timing capacitor 196, and a 200K ohms current injection resistor 198, configured identically to the programmable timer 160 of FIG. 6. As in FIG. 6, the master reset pin 6 of the programmable timer IC 191 is controlled by the voltage output by the operational amplifier 182. The master reset pin 6 is configured to toggle between to toggle between "timer operation" when the output of the operational amplifier 182 is "low" and "master reset on" when the output of the operational amplifier 182 is "high." In "master reset on" mode, the counters of the programmable timer IC 191 are reset to a high state (about 12 volts) on the output pin 8 until the voltage on the "master reset on" becomes "low," after which the programmable timer IC 191 outputs a high state for predetermined amount of time as set by the resistors 192, 194 and the capacitor 196.

In operation, the diode 172 senses voltage across the power factor control circuit 2. When the peak voltage across the power factor control circuit 2 is above a predetermined threshold voltage, the output of the comparator circuit 180 goes "high." This sets the master reset pin 6 of the programmable timer IC 191 to "master reset on" mode, during which the output on pin 8 is set to "high." The programmable timer IC 191 outputs a "high" signal on pin 8. This causes a current to flow through current injection resistor 198, which generates an offset current in the power factor control circuit 2. As a result, a maximum amount of voltage is applied to the motor 14.

As a result of the application of full voltage across the motor 14, the voltage across the power factor control circuit 2 decreases, thereby reducing the voltage sensed by the diode 192. This reduces the voltage at the output of the half-wave rectifier circuit 170. When the voltage at the negative input terminal of the comparator circuit 180 falls below the predetermined threshold voltage of about 6 volts, the output of the comparator circuit 180 enters a low state, thereby setting pin 6 of the programmable timer IC 191 to a low state, or "timer operational mode." This causes the programmable timer IC 191 to output a high state (about +12 volts) on pin 8, thereby causing the current injection resistor 198 to inject current into point "C" of the power factor control circuit 2. The programmable timer IC 191 counts for a predetermined amount of time. After the predetermined amount of time expires, the output at pin 8 of the programmable timer IC 191 transitions to a low state. As a result, the power factor control circuit 2 enters the energy saving mode.

Should the motor begin to stall, the voltage across the power factor control circuit 2 will rise above the predetermined threshold voltage of about 6 volts, thereby retriggering the current injection circuit 106 to cause it to apply full voltage to the motor until about 15 seconds after the motor voltage falls below the predetermined threshold voltage, and thus the cycle repeats as described above.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. An energy saver delay circuit for an induction motor, comprising: a power factor control circuit including an integrator having a negative summing junction; and a current injection circuit electrically connected to the negative summing junction, wherein the current injection circuit injects offset current into the negative summing junction to cause about the maximum available voltage from a power source, coupled to the negative summing junction, to be supplied to the motor for a predetermined amount of time;
   wherein the current injection circuit comprises a programmable timer and a current injection resistor electrically connected to the programmable timer and to the negative summing junction, and wherein the programmable timer supplies current through the current injection resistor for the predetermined amount of time, and
   wherein the current injection circuit is triggered by voltage applied to the motor, when the voltage exceeds a predetermined value.

2. The circuit of claim 1, wherein the programmable timer is configured to reset and count for the predetermined amount of time on power up.

3. An energy saver delay circuit for an induction motor, comprising: a power factor control circuit including an integrator having a negative summing junction; and a current injection circuit electrically connected to the negative summing junction, wherein the current injection circuit injects offset current into the negative summing junction to cause about the maximum available voltage from a power source, coupled to the negative summing junction, to be supplied to the motor for a predetermined amount of time;

a current sensing resistor configured to sense the current through the motor, wherein the current injection circuit comprises: an amplifier circuit configured to measure the voltage across the current sensing resistor and to convert the sensed current to an amplified voltage; a half-wave rectifier circuit electrically connected to an output of the amplifier circuit and configured to output a first value when the amplified voltage is of one polarity, and to output a second value when the amplified voltage is of another polarity; a comparator circuit electrically connected to an output of the positive half-wave rectifier circuit and configured to square an output waveform of the positive half-wave rectifier circuit responsive to the current though the motor exceeding the predetermined threshold current; and a programmable timer electrically connected to an output of the comparator circuit, the programmable timer including a current injection resistor between the programmable timer and the negative summing junction, and wherein the current injection circuit is triggered by current flowing through the motor, responsive to the current exceeding a predetermined threshold current.

4. The circuit of claim 3, wherein the programmable timer supplies current continuously through the current injection resistor when the sensed current exceeds the predetermined threshold current, and supplies current for a predetermined amount of time when the sensed current falls below the predetermined threshold current.

5. An energy saver delay circuit for an induction motor, comprising: a power factor control circuit including an integrator having a negative summing junction; and a current injection circuit electrically connected to the negative summing junction, wherein the current injection circuit injects offset current into the negative summing junction to cause about the maximum available voltage from a power source, coupled to the negative summing junction, to be supplied to the motor for a predetermined amount of time; wherein the current injection circuit further comprises: a half-wave rectifier circuit electrically connected across the power factor control circuit and configured to rectify an AC voltage across the power factor control circuit and to reduce the peak voltage to within the operating voltage range of the current injection circuit; a comparator circuit electrically connected to an output of the half-wave rectifier circuit and configured to square an output waveform of the half-wave rectifier circuit responsive to the voltage across the power factor control circuit exceeding the predetermined threshold voltage; and a programmable timer electrically connected to an output of the comparator circuit, the programmable timer including a current injection resistor between the programmable timer and the negative summing junction, and wherein the current injection circuit is triggered by voltage across the power factor control circuit, responsive to the voltage exceeding a predetermined threshold voltage.

6. The circuit of claim 5, wherein the programmable timer supplies current for a predetermined amount of time when the voltage across the power factor control circuit exceeds and then falls below the predetermined threshold voltage.

7. A power factor control circuit for an induction motor, comprising: a voltage/current phase difference generator for determining a difference in phase between a voltage applied to the motor and a current drawn by the motor, and for generating a phase difference signal as a function of the determined difference in phase, the voltage/current phase difference generator including an integrator, the integrator receiving the phase difference signal and generating an error signal for controlling an amount of power supplied to the motor as a function of the phase difference signal, the integrator having a negative summing junction; and a current injection circuit electrically connected to the negative summing junction, wherein the current injection circuit injects an offset current into the negative summing junction to cause about the maximum available voltage from a power source, coupled to the negative summing junction, to be supplied to the motor, coupled to the power factor control circuit, for a predetermined amount of time; wherein the current injection circuit comprises a programmable timer and a current injection resistor electrically connected to the programmable timer and to the negative summing junction, wherein the programmable timer supplies current through the current injection resistor for the predetermined amount of time, and wherein the current injection circuit is retriggered to cause full voltage to be supplied to the motor for a predetermined amount of time responsive to AC power being cycled off and on.

8. The circuit of claim 7, wherein the programmable timer is configured to reset and count for the predetermined amount of time on power up.

9. A power factor control circuit for an induction motor, comprising: a voltage/current phase difference generator for determining a difference in phase between a voltage applied to the motor and a current drawn by the motor, and for generating a phase difference signal as a function of the determined difference in phase, the voltage/current phase difference generator including an integrator, the integrator receiving the phase difference signal and generating an error signal for controlling an amount of power supplied to the motor as a function of the phase difference signal, the integrator having a negative summing junction; and a current injection circuit electrically connected to the negative summing junction, wherein the current injection circuit injects an offset current into the negative summing junction to cause about the maximum available voltage from a power source, coupled to the negative summing junction, to be supplied to the motor for a predetermined amount of time; current sensing resistor configured to sense the current through the motor, and wherein the current injection circuit comprises: an amplifier circuit configured to measure the voltage across the current sensing resistor and to convert the sensed current to an amplified voltage; a half-wave rectifier circuit electrically connected to an output of the amplifier circuit and configured to output a first value when the amplified voltage is of one polarity, and to output a second value when the amplified voltage is of another polarity; a comparator circuit electrically connected to an output of the positive half-wave rectifier circuit and configured to square an output waveform of the positive half-wave rectifier circuit responsive to the current though the motor exceeding the predetermined threshold current; and a programmable timer electrically connected to an output of the comparator circuit, the programmable timer including a current injection resistor between the programmable timer and the negative summing junction, and wherein the current injection circuit is triggered by current flowing through the motor, responsive to the current exceeding a predetermined threshold current.

10. The circuit of claim 9, wherein the programmable timer supplies current continuously through the current injection resistor when the sensed current exceeds the predetermined threshold current, and supplies current for a predetermined amount of time when the sensed current falls below the predetermined threshold current.

11. A power factor control circuit for an induction motor, comprising: a voltage/current phase difference generator for determining a difference in phase between a voltage applied to the motor and a current drawn by the motor, and for generating a phase difference signal as a function of the determined difference in phase, the voltage/current phase difference generator including an integrator, the integrator receiving the phase difference signal and generating an error signal for controlling an amount of power supplied to the motor as a function of the phase difference signal, the integrator having a negative summing junction; and a current injection circuit electrically connected to the negative summing junction, wherein the current injection circuit injects an offset current into the negative summing junction to cause about the maximum available voltage from a power source, coupled to the negative summing junction, to be supplied to the motor for a predetermined amount of time; wherein the current injection circuit comprises: a half-wave rectifier circuit electrically connected across the power factor control circuit and configured to rectify an AC voltage across the power factor control circuit and to reduce the peak voltage to within the operating voltage range of the current injection circuit; a comparator circuit electrically connected to an output of the half-wave rectifier circuit and configured to square an output waveform of the half-wave rectifier circuit responsive to the voltage across the power factor control circuit exceeding the predetermined threshold voltage; and a programmable timer electrically connected to an output of the comparator circuit, the programmable timer including a current injection resistor between the programmable timer and the negative summing junction, and wherein the current injection circuit is triggered by current flowing through the motor, responsive to the current exceeding a predetermined threshold current.

12. The circuit of claim 11, wherein the programmable timer supplies current for a predetermined amount of time when the voltage across the power factor control circuit exceeds and then falls below the predetermined threshold voltage.

* * * * *